June 14, 1932.  A. DINA  1,863,300
SUPPORT AND ADJUSTMENT FOR SPEAKING MOVIE EXCITER LAMPS
Filed March 1, 1930  3 Sheets-Sheet 1
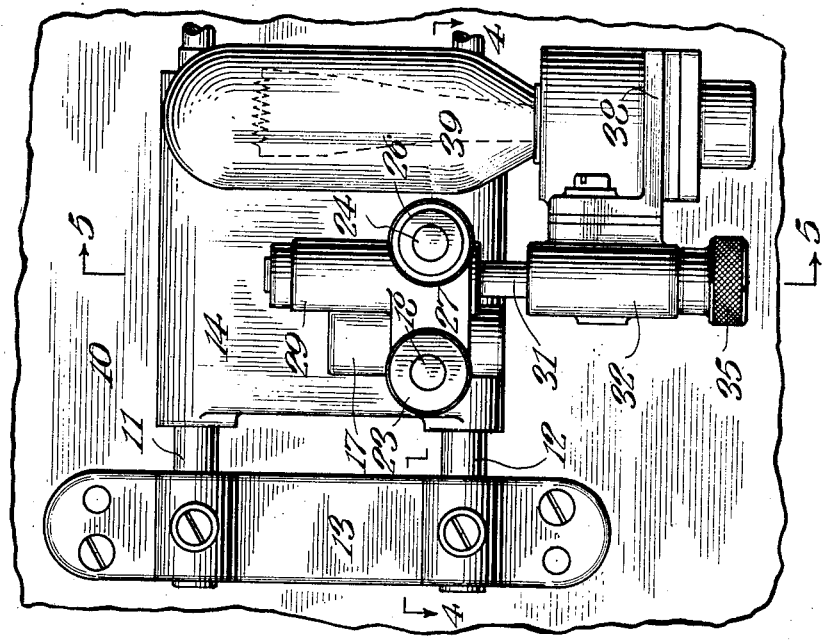
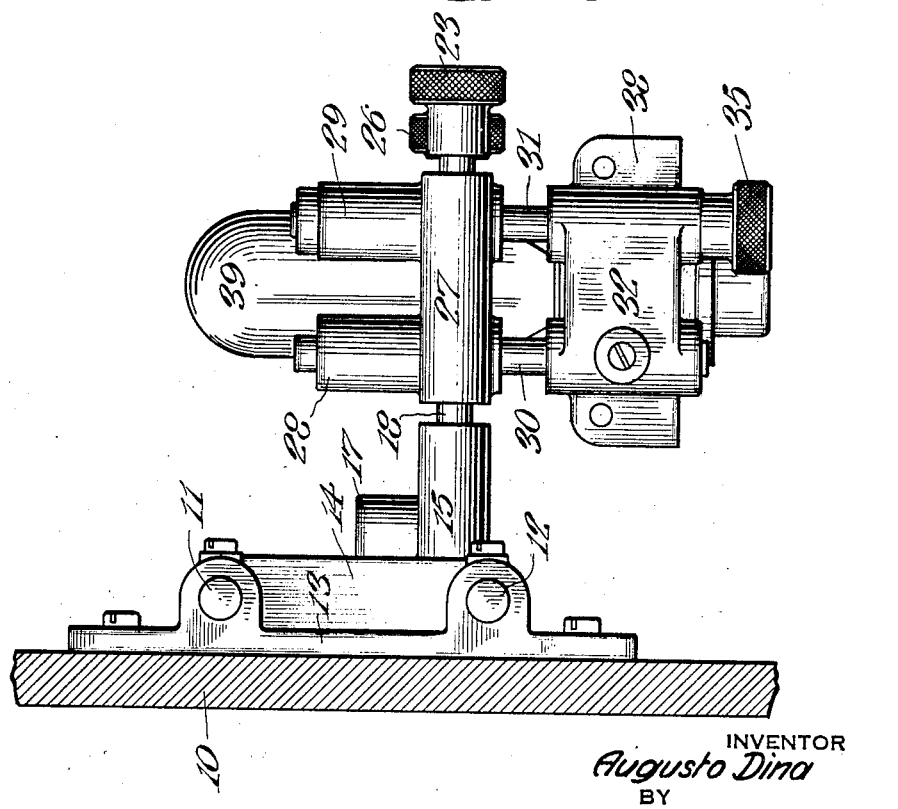
INVENTOR
*Augusto Dina*
BY
*Howard W. Dix*
ATTORNEY June 14, 1932. A. DINA 1,863,300
SUPPORT AND ADJUSTMENT FOR SPEAKING MOVIE EXCITER LAMPS
Filed March 1, 1930 3 Sheets-Sheet 2
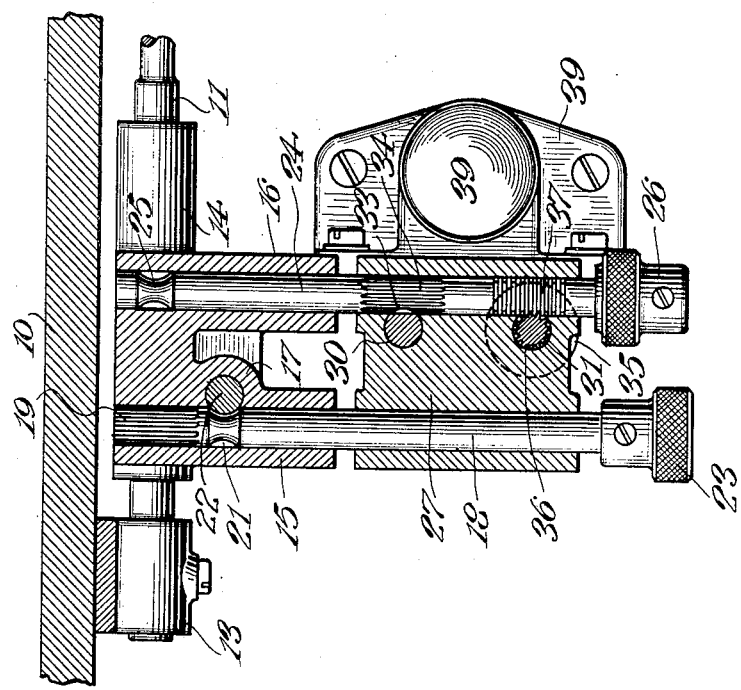
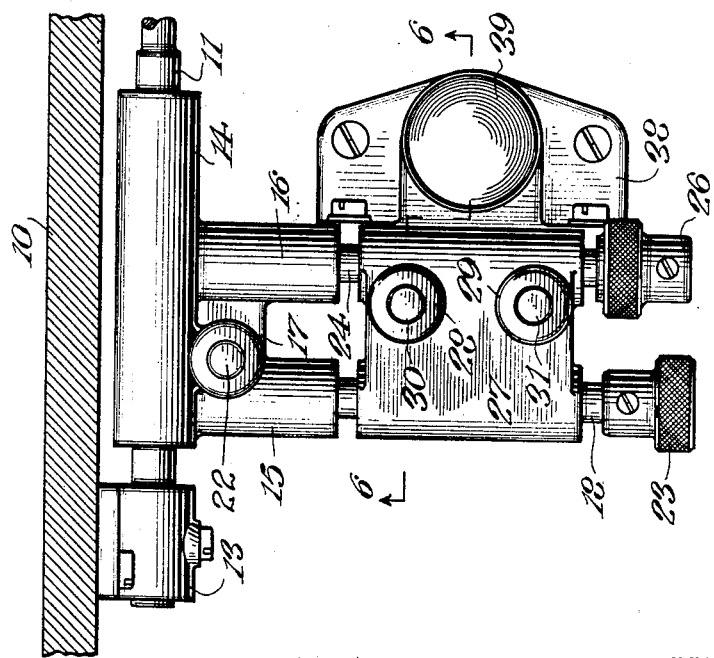
INVENTOR
Augusto Dina
BY
Howard W. Dix
ATTORNEY June 14, 1932.  A. DINA  1,863,300
SUPPORT AND ADJUSTMENT FOR SPEAKING MOVIE EXCITER LAMPS
Filed March 1, 1930  3 Sheets-Sheet 3
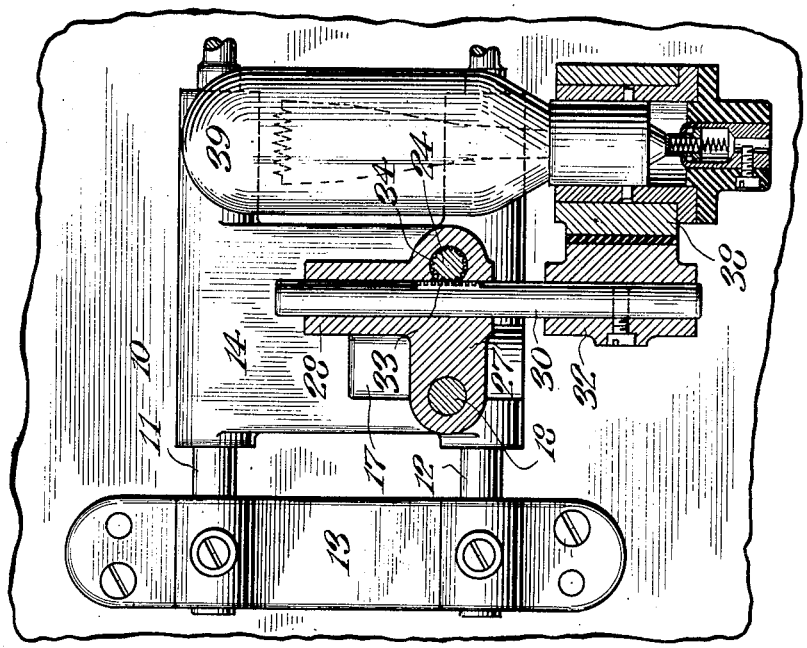
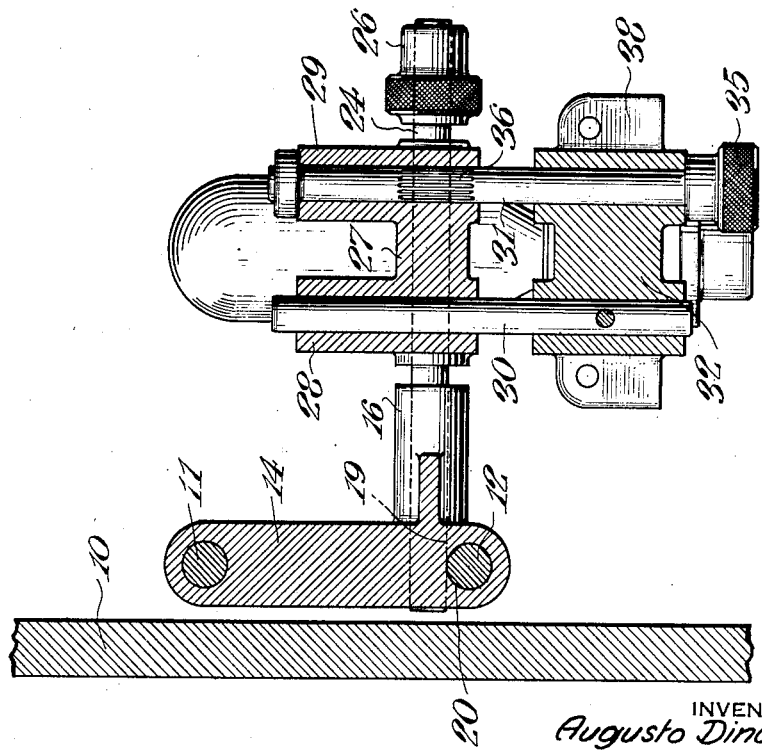
INVENTOR
Augusto Dina
BY
Howard W. Fox
ATTORNEY Patented June 14, 1932

1,863,300

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

SUPPORT AND ADJUSTMENT FOR SPEAKING MOVIE EXCITER LAMPS

Application filed March 1, 1930. Serial No. 432,313.

This invention relates to a new and useful improvement in supports and adjusting devices for elements such as lamps, and has particular reference to a supporting and adjusting device for the exciter lamp such as is used in motion picture projectors in which a portion of the film contains striata through which light is projected by the type of lamp as above mentioned to be transformed into sound by suitable apparatus.

The main object of the invention is to provide a simple, compact, easily operable device or structure whereby the exciter lamp may be adjusted either up or down, backward or forward, or laterally in two directions, so as to permit the lamp to be easily and accurately alined with the lens system and the photo-electric cells with which it forms a system for transferring the photographic striata indications into sound.

A further object is to provide such an adjusting device as will permit the adjustments in several planes to be made at one time so that the adjustment in one plane is made independently of its adjustment in other planes.

Further and more specific objects, features, and advantages will more clearly appear from the detailed description given below when taken in connection with the accompanying drawings which form part of the specification and which illustrate one present preferred form of the invention.

Generally speaking the invention relates to an improved support of a lamp such as the exciter. In speaking movies this lamp is usually supported on the projector and is associated with the lens combination of the system whereby the photo striata indications are transferred into sound. The lens combination is also alined with a photo-electric cell so that the light thrown by the exciter lamp through the striata onto the cell will properly produce current variations therein and which are set up as sound later on in the system. It is therefore very important that the exciting light of the lamp be properly positioned and focused and that when out of focus or alinement it may be quickly and easily returned to the proper place. To this end this invention is presented. Briefly the invention includes a plurality of relative slidable frames or plates which may be simultaneously and independently adjusted, the whole set of elements preferably being supported from the wall or partition which supports the mechanism of the projector within the head thereof, but it is to be understood that they may be supported in any other satisfactory manner.

More particularly the invention includes a plate supported slidably along the face of the partition and having rods extending outward therefrom on which another plate or frame is slidable in a plane at right angles to the first plate. From this second plate or frame a third frame or plate is supported for slidable movement in a plane at right angles to the planes of movement of the other two frames or plates. Certain of the supporting rods are operable to effect the sliding movement of the frames and the relation of the driving elements are such that two or more of them can be operated at the same time without interfering with each other.

The present preferred form of the invention is illustrated in the drawings in which, Fig. 1 is an end elevation of the exciter lamp on its support;

Fig. 2 is a side elevation thereof;

Fig. 3 is a plan view thereof;

Fig. 4 is a horizontal section taken on the line 4—4 of Fig. 2;

Fig. 5 is a vertical section taken on the line 5—5 of Fig. 2; and,

Fig. 6 is in part a vertical section taken on the line 6—6 of Fig. 3.

As shown in the drawings, the invention relates to a simple compact and efficient mounting whereby an exciter lamp, such as is used in connection with the film in speaking moving pictures, may be easily and quickly manipulated to adjust it with respect to the film and the lens combination with which it is associated in operation.

The drawings illustrate the mechanism-supporting wall or partition 10 to which an advantageous light-supporting mechanism such as a pair of rods 11 and 12 may be fastened by any suitable means as by brackets 100

13. Preferbaly these brackets are disposed in a horizontal direction and spaced apart any desired distance to form sliding supports for a frame or plate 14 which is suitably bored to permit it sliding along these two supporting rods. This frame is generally disposed in a vertical plane and is provided with two horizontally extending bored bosses 15 and 16 preferably near its lower edge and a vertically disposed boss 17 near the boss 15. Disposed in the boss 15 is a shaft 18 one end of which preferably is provided with a gear 19 adapted to mesh with rack teeth 20 on the adjacent portion of the lower rod 12. Thus by turning the shaft 18 the frame 14 may be moved horizontally along the rods to any adjusted position. Near the gear 19 on the shaft 18 there is provided a peripheral groove 21 adapted to receive an edge or portion of a stud or pin shaft 22 disposed in a bore in the vertical boss 17. This engagement will lock the shaft 18 from longitudinal movement while permitting turning movement thereof. The other end of the shaft 18 has an operating knob 23 whereby it may be turned.

The other boss 16 is bored to receive another shaft 24 which at its inner end is provided with a peripheral groove 25 receiving the adjacent portion of the rod 12 and permitting the shaft 24 to turn but preventing the longitudinal movement thereof. The other end of the shaft 24 is provided with an operating knob 26 whereby it may be turned easily.

On the outer ends of the shafts 18 and 24 is slidably disposed another frame or plate 27 preferably in a horizontal plane and slidable inwardly and outwardly on rods or shafts 18 and 24 to and from the wall 10. This plate 27 is bored with passages to receive the rods 18 and 24. It is also provided with upstanding bosses 28 and 29 bored to receive two rods 30 and 31. The lower ends of these rods 30 and 31 pass through bores in a head 32 to which the rod 30 is pinned and which is supported by the rod 30.

Near its upper end the rod 30 is provided with a rack element 33 adapted to engage with a gear element 34 on the shaft 24 so that when the shaft 24 is turned it will move the head 32. The lower end of the shaft 31 is provided with an operating knob thereon. This rod 31 is provided near its top with a gear element 36 meshing with a rack 37 on the shaft 24 so that as the rod 31 is turned the frame 27 will be moved inwardly or outwardly on the shafts 18 and 24.

Supported from the head 32 there is a lamp socket 38 in which a lamp 39 is received by the usual bayonet and slot connections in such position that the filament of the lamp is then in exactly the right position. This lamp is used to throw light through the film where the usual sound striata are thereon disposed and thereafter to excite a photo-sensitive cell as is in accordance with well known methods.

The idea of the various adjustments and mechanism above described is to enable this lamp 39 to be accurately, quickly, and easily manipulated with regard to the film aperture.

In the operation of the device, it will be seen that the frame 14 is slidable along the rods 11 and 12 merely by turning the knob 23 which turns the shaft 18 and causes the gear 19 to ride along the rack 20 on the rod 12.

In order to move the frame or plate 27 outwardly or inwardly it is only necessary to turn the knob 35 on the lower end of the rod 31 which will cause the gear 36 to ride along the rack 37 on shaft 24, and thus move the frame 27 one way or the other. While this is taking place, the rack 33 is sliding along the gear teeth 34. Similarly when the knob 26 is turned the shaft 24 is turned and this causes the gear 34 to turn and through the rack 33 drive the rod 30 downward or upward to lower or raise the head 32. At this time the rack ribs 37 are turning between the teeth of the gear 36.

Thus there is provided an improved simple and efficient means to move the frame 27 inwardly and outwardly and to raise and lower the head, each one of the adjusting elements being operable independently of the others and at any time. These adjustments permit the lamp 39 to be quickly and easily and accurately alined with the lens combination and the photo-electric cell with which it forms a suitable transforming system for the sound striata on the motion picture film.

While the invention has been described in detail and with respect to a present preferred form thereof, it is not to be limited to such details and forms since many changes and modifications may be made and the invention embodied in other forms and modifications coming within the spirit and scope of the invention in its broadest aspects. Hence it is desired to cover any and all forms and modifications which may come within the language or scope of any one or more of the appended claims.

What is claimed, is,

1. An adjusting and supporting device which comprises a mechanism supporting partition, a plurality of rods disposed thereon, a frame slidably supported on said rods, a plurality of rods extending from said frame, a second frame disposed thereon, one of said second mentioned rods engaged with one of the first mentioned set of rods and movable thereby to slide the first frame along its supporting rods, a lamp support disposed adjacent the second frame, a plurality of rods extending from the second frame to the lamp support, means on one of said last mentioned rods to engage one of the rods extending from the first frame to the second frame whereby to slide the second frame along its supporting rods, and means permitting the engagement of another of the rods extending from the second frame to the lamp support with the said rod extending from the first frame to the second frame to cause a movement of the lamp support in a plane at right angles to the movement of the other two frames when the said rod extending from the first to the second frame is turned.

2. A lamp adjusting device which comprises a partition, a plurality of rods disposed thereon, a frame supporting a lamp and slidable along said rods, a pair of rods extending at right angles from said frame, a second frame slidable along said last mentioned rods, a gear on one of said last mentioned rods, a rack on one of said first mentioned rods and meshing with the gear to permit sliding movement of the first frame along its supporting rods, the other of the rods extending through the second frame having a gear and a circular rack thereon, and said last mentioned rod being turnable in said second frame, a pair of rods dependent from the second frame, one of said last mentioned rods having a circular rack meshing with the gear on the rod passing through the second frame, and the other of the dependent rods from the second frame having a gear thereon meshing with the circular rack on the rod extending through the second frame.

AUGUSTO DINA.